United States Patent
Lieberman et al.

(10) Patent No.: US 8,089,659 B2
(45) Date of Patent: Jan. 3, 2012

(54) 4+ COLOR MANAGEMENT FOR GAMUT EXTENSION USING A VIRTUAL CMYK METHODOLOGY

(75) Inventors: David J. Lieberman, Fairport, NY (US); Stuart A. Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 451 days.

(21) Appl. No.: 12/463,469

(22) Filed: May 11, 2009

(65) Prior Publication Data

US 2010/0284029 A1    Nov. 11, 2010

(51) Int. Cl.
  *H04N 1/60* (2006.01)
  *G03F 3/08* (2006.01)
(52) U.S. Cl. ......... 358/1.9; 358/518; 358/520; 358/523
(58) Field of Classification Search .................. 358/1.9, 358/518, 520, 523, 162, 167; 345/590, 591
See application file for complete search history.

(56) References Cited

U.S. PATENT DOCUMENTS

| | | | |
|---|---|---|---|
| 7,535,596 B2 * | 5/2009 | Spaulding et al. | 358/1.9 |
| 2003/0098896 A1 * | 5/2003 | Berns et al. | 347/15 |
| 2004/0114166 A1 * | 6/2004 | Kubo | 358/1.9 |
| 2005/0128491 A1 * | 6/2005 | Kubo | 358/1.1 |
| 2006/0250624 A1 * | 11/2006 | Spaulding et al. | 358/1.9 |
| 2006/0285742 A1 * | 12/2006 | Arai et al. | 382/162 |
| 2010/0085586 A1 * | 4/2010 | Tin | 358/1.9 |
| 2011/0122426 A1 * | 5/2011 | Tin | 358/1.9 |
| 2011/0149307 A1 * | 6/2011 | Tin | 358/1.9 |

* cited by examiner

*Primary Examiner* — Kimberly A Williams
(74) *Attorney, Agent, or Firm* — Oliff & Berridge, PLC

(57) ABSTRACT

4+ color management sequentially processes four colors at a time from among the 4+ colors to leverage solution capability using a 4-color management tools. In methods and apparatus for processing 4+ colors, received information of 4+ colors may be processed in a first stage using four colors of the 4+ colors, such as CMYO. The processed four colors are then mapped into three virtual colors. The mapped three virtual colors and one additional unprocessed color of the 4+ colors are then processed in a second stage using a 4-color tool. From this, a second color model of at least five colors (4+) is generated. The resulting four colors determine five printer colors, and are then mapped into three virtual colors. The mapped three virtual colors and one additional unprocessed color of the 4+ colors are then processed in a third stage using a 4-color tool. From this, a third color model of at least five colors (4+) is generated. This modeling and mapping to virtual input can be repeated for once for each color beyond 4 that is supported by the printer. The processed 4+ colors are output to a device, such as a printing engine, for rendering the image.

20 Claims, 6 Drawing Sheets

4+ COLOR MANAGEMENT FOR GAMUT EXTENSION USING A VIRTUAL CMYK METHODOLOGY

BACKGROUND

Conventional 4-color CMYK (cyan, magenta, yellow and black) color systems used for processing a color model attempt to accommodate a well defined source color input, interpret the source color input in terms of an intermediary color space, such as the L*a*b* color space, and map the color through the color space to a realizable destination color based on characteristics of the printer. An example of this process is shown in FIG. 1. The mapping from the realizable destination color to the L*a*b* color system and then to the source color is called the "forward printer model" because it is based on measured and modeled characteristics of the printer and knowledge of the source profile. The mapping from the requested source color to the destination color requires the opposite mapping, and is therefore called the "inverse printer model," as shown in FIG. 1.

Many tools and techniques have been matured over an extended period to manage color on a 4-color printing system, such as a CMYK print engine. On the other hand, a printing system that has more than four colors (4+ colors) might be expected to use custom tools to process the 4+ colors. However, these types of tools are expected to be very complex because the level of redundancy and the number of color combinations to be supported by the system increases rapidly as a function of the number of supported colors.

SUMMARY

Machines that employ more than four colors have greater levels of redundancy and may require new tools of greater complexity. Developing such a complex tool is a significant investment in resources, likely to require a substantial effort over an extended period. To use the tool properly, thorough documentation and training sessions would be required as well.

Aspects of the application is to eliminate the need to develop such complex tools by leveraging the simpler existing four color tool to solve more difficult 4+ color problems. A similar solution using a four color tool can be found in Copending U.S. application Ser. No. 12/135,546 entitled "4+Color Management Using a Virtual CMYK Color Paradigm" to Lieberman et al., the entire disclosure of which is hereby incorporated herein by reference in its entirety. Leveraging the existing 4-color tools avoids the delay associated with waiting for the development of a new complex tool. The schedule risk and expensive development cycle is avoided.

In various exemplary embodiments of the application, a simplified color processing method and apparatus using a 4-color tool are provided.

In exemplary embodiments, existing 4-color tools are leveraged to solve N-color management tasks, where N>4. This is achieved by solving what appears to be a succession of 4-color problems. In the first stage, 4-color tools are used to construct a 4-color model, where these 4 colors are a subset of the existing N colors supported by the system. This solution is used as a seed which can be grown to solve the N-color problem. In the second step, we solve a subsequent 5-color problem. This is accomplished by exploiting the inverse of this first color model to reduce the dimensionality of the first solution from 4 to 3. In this way, the 5-color problem can be made to appear like a 4-color task, and solved leveraging 4-color tools to construct a second color model. This deception is referred to as a virtual CMYK methodology. In the next step, the inverse of the second color model can be exploited to reduce the dimensionality of the second solution from 5 to 3. Then, we can solve a subsequent 6-color problem that can be made to appear like a 4-color task, and solved leveraging 4-color tools to construct a third color model. This procedure is repeated once for each color greater than 4 supported by the system.

For example, in exemplary embodiments of the methods for processing 4+ colors, received information of at least five colors is processed first using four colors of the at least five colors by a 4-color tool. The inverse of the first color model provides a mapping from three virtual source colors to four printer colors. This mapping is a useful summary of a larger number of real output printer colors in the form of fewer virtual input colors. It enables 4-color tools to solve color management problems for systems that support an arbitrary large number of supported output colors. In the next stage of processing, the three virtual input colors and one of the unprocessed colors of the at least five colors are processed using the 4-color tool. However, in this subsequent 4-color solution, one printer colorant may be retained and the other three output colorants may be interpreted as the previously exploited virtual colors. The inverse mapping from the first color model is used to map these three virtual colors back into four real printer colorants, yielding a total of five defined output printer colors. The resulting 5-color solution is the starting position required to fold in another candidate input color. Thus, each 4-color solution step brings one additional color separation into the model.

In various exemplary embodiments of the apparatus for processing 4+ colors according to this application, the apparatus includes a printer model calculating unit that obtains and processes color information of at least five colors, a color replacing unit that maps the three virtual colors into four printer colors, and a controller that outputs at least five colors processed. The printer model calculating unit processes four of the at least five colors. The color replacing unit then maps the three virtual colors into five printer colors. The printer model calculating unit then processes the three virtual colors and one of unprocessed colors of the at least five colors.

Furthermore, the mapping from three virtual colors into four or more printer colors may be smoothened. The four colors for processing may include colors of CMYYK.

BRIEF DESCRIPTION OF THE DRAWINGS

Exemplary embodiments will be described with reference to the attached drawings, in which like numerals represent like parts, and in which.

EMBODIMENTS

In various exemplary embodiments according to the disclosure, there is a source color space (e.g. GRACoL $C_G M_G Y_G$) and 4+ printer colors (e.g., CMYKOV) are processed in a printing machine by first processing four printer colors (e.g., CMYO) of the 4+ colors using a conventional 4-color tool. The inverse of the first 4-color printer model provides a mapping from three source colors (e.g. GRACoL $C_G M_G Y_G$) to four printer colors $C_1 M_1 Y_1 O_1$. This mapping allows these three source colors to be exploited as a surrogate for the four printer colors. This substitution of a smaller number of virtual colors for printer colors is a useful aspect of the features of the disclosure. The three source colors used need not be selected from a traditional source color standard, such as GRACol. In one embodiment, the gamut spanned by the source colors is made sufficiently large as to cover the entire N-color printer gamut. This may guarantee the entire printer gamut will be utilized. The 3-color source and another unprocessed color (e.g., V) of the next one of the 4+ printer colors is processed to build a second 4-color model. The processed second four colors are mapped using the second printer model to four printer colors. However, three of these printer colors may be actually interpreted as virtual colors (e.g., $C_G M_G Y_G$), which are a surrogate for four real printer colors using the inverse of the first printer model. Therefore, cascading the two models may provide a mapping from source color to five real printer colors, as suggested by later-discussed Equation 4. Finally, the last color (e.g., K) of the 4+ colors for output is afforded similar treatment to produce a 6-color solution. In various exemplary embodiments, the printing machine includes, but is not limited to, a printer, copier, fax machine and any other printing device that may be suitable for using the exemplary embodiment according to the disclosure. It should be appreciated that the various embodiments are not limited to the use of four colors but may use less than four color tools. An extension of this technology includes the use of a mature tool that uses RGB (alternatively YCrCb or L*a*b*) source color to build 4+ printer color models using a similar virtual RGB (alternatively YCrCb or L*a*b*) methodology. As with other embodiments, repeated mapping of source space colors with a dimensionality of at least three, to output printer colors may be used.

While the present disclosure will be described in connection with an exemplary embodiment thereof, it will be understood that it is not intended to limit the disclosure to that embodiment. On the contrary, it is intended to cover all alternatives, modifications, and equivalents as may be included within the spirit and scope of the disclosure as defined by the claims.

Figure 1:
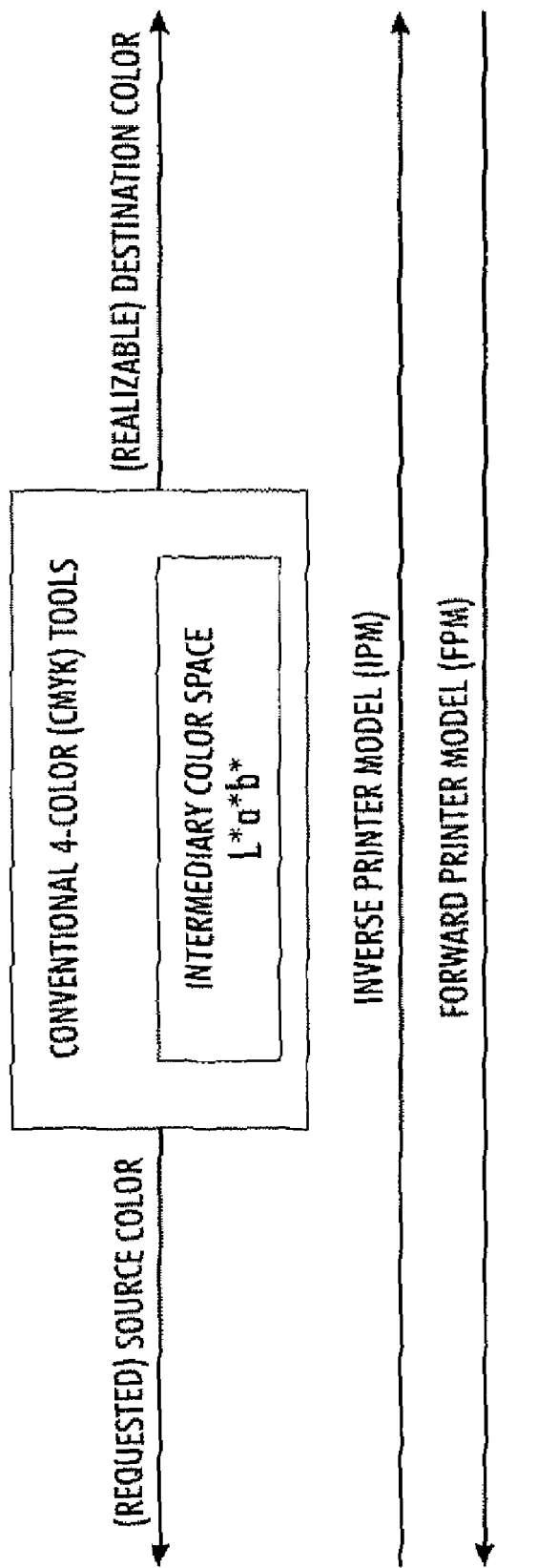
FIG. 1 is a diagram showing an image processing scheme using an inverse printer model (IPM) and a forward printer model (FPM)

Reference will be made to FIG. 1, which shows a diagram of color management using a conventional 4-color tool. Conventional 4-color CMYK color tools will attempt to accommodate a well defined source color input, interpret that in terms of an intermediary color space such as L*a*b*, and map that through to realizable system color based on characteristics of the printer, as illustrated in FIG. 1. The mapping from realizable system color to L*a*b* and then source color is called the forward printer model because it is based on measured and modeled characteristics of the printer and knowledge of the source profile. The mapping from the requested source color to destination color requires the opposite mapping, and is therefore called the inverse printer model, as shown by the arrows in FIG. 1. Many commercial 4-color tools exist, including CMYKick tool by Color Solution, which produces 4-color CMYK-ICC profiles. Similarly, CHROMiX uses their ColorValet toolbox to produce custom 4-color CMYK-ICC profiles. Often, companies in the printing industry employ proprietary internal color tools to manage 4-color output devices.

A procedure for accommodating all N-color printing device (also referred to as a 4+ color printing device), where N>4, may be initiated in accordance with aspects of the disclosure by a conventional 4-color management tool as in FIG. 1 using four of the 4+ colors. For example, if a device, such as a printer, supports six colors, such as CMYKOV (cyan, magenta, yellow, black, orange and violet, respectively), and if the source color information of the image is based on GraCol CMYK, then first four colors are selected from the six colors. For example, CMYO may be selected. The first 4-color solution may be given by Equation 1.

$$[CMYK]_{Gra} \underset{F.P.M._1}{\overset{I.P.M._1}{\rightleftarrows}} [C_1, M_1, Y_1, O_1] \qquad (1)$$

where the GraCol CMYK source color information is referred to as $[CMYK]_{Gra}$. In this example, the first four system output colors accommodated may be CMYO as discussed above, and the processed first four system output colors are referred to as $[C_1 M_1 Y_1 O_1]$. This is the first 4-color model to be generated using a conventional 4-color procedure and 4-color tool, as indicated by the subscripts "1" in Equation 1. The arrows in Equation 1 indicate the direction of the first forward and inverse processings. In Equation 1, $I.P.M._1$ means an inverse printer model for the first 4-color model, and $F.P.M._1$ means a forward printer model for the first 4-color model. To perform Equation 1, a series of operations may be performed.

Based on FIG. 1, a collection of printer CMYO patches may be printed, and the L*a*b* values for the patches may be measured ($[CMYO]_{printer} \rightarrow L*a*b*$); where ($[CMYO]_{printer}$ represents the CMYO color information based on the colors supported by the 4+ color printing system). Based on the L*a*b* values, the printer may be characterized so that for every combination of printer CMYO, the corresponding L*a*b* value may be determined. The locus of these points may be referred to as the printer CMYO gamut. Based on the source color profile, the mapping from the printer CMYO gamut to the source color may be determined.

Figure 2A:
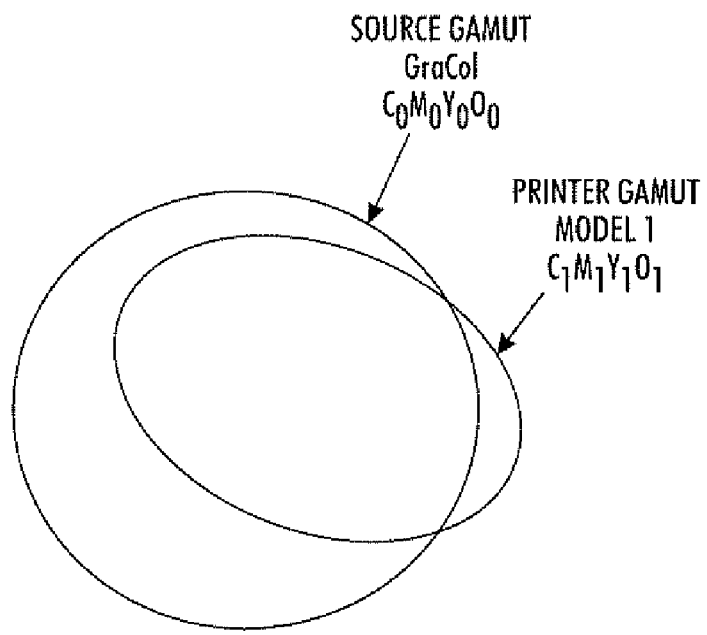
FIGS. 2a and 2b show mapping of a processed printer $C_1M_1Y_1O_1$ gamut.
Figure 2B:
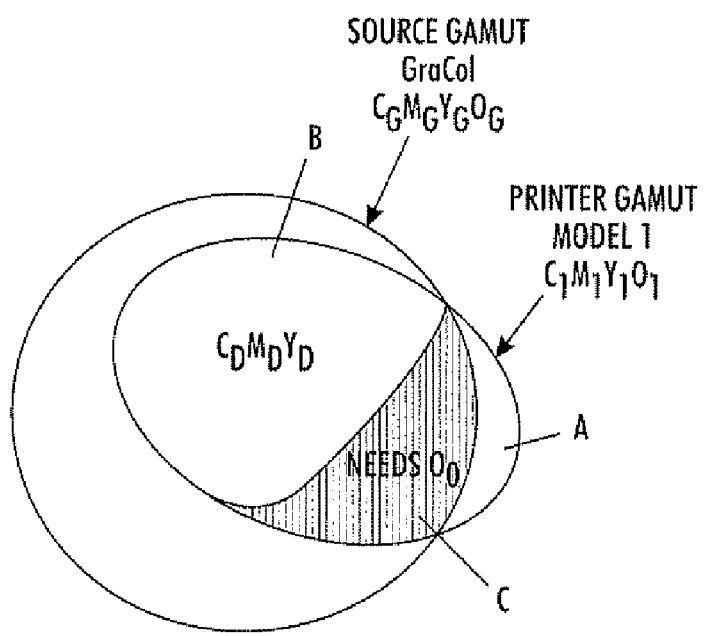

FIG. 2a graphically represents the mapping, where the requested GraCol CMYK source colors (i.e., $[CMYK]_{Gra}$) are represented by points inside a solid line circle, and all of the realizable colors using the printer CMYO colorants (i.e., $[CMYO]_{printer}$ or $[C_1 M_1 Y_1 O_1]$) are represented by a smaller circle. This illustration may be further refined by partitioning the $C_1 M_1 Y_1 O_1$ printer gamut into three parts, as illustrated by the shaded areas on FIG. 2b. In FIG. 2b, region A refers to an area that is not useful because this area of the printer gamut cannot be requested by any combination of GraCol CMYK, and therefore may not be needed. Region B represents the mapping of realizable destination colors for only $C_1 M_1 Y_1$, which may be referred to as $C_D M_D Y_D$. These L*a*b* values may be reached without the use of any orange colorant $O_D$, or $O_1$, but this does not preclude the use of orange to realize these L*a*b* values because, for example, some of the magenta and yellow colors may be replaced by orange. Region C of the printer gamut is inside of the GraCol CMYK gamut and therefore useful, but the L*a*b* values in region C may only be achieved by using some of the gamut extension colorant, i.e., orange $O_1$, as shown in FIG. 2b. At this point, the only printer colorant usage level likely to resemble the final 4+ color solution is orange. The CMY colorant usage will be reworked repeatedly as they are treated as virtual colors as each additional printer colorant is folded into consideration, one at a time. However, the mapping from source color to orange may remain relatively fixed after application of the first printer model. Particularly after application of the smoothing step, which is intended to produce a smooth relation between source color and orange color usage. The only remaining changes to orange colorant usage will likely come from subsequent smoothing operations applied after each color is folded into the 4+ color model.

Next, a 4-color virtual printer (4CVP) deception may begin. A second color management task may be started as described by Equation 2, and it may appear to be another 4-color problem that is solved using conventional 4-color tools. In Equation 2, the fifth color, violet V, may be processed. Similar to the first color model as discussed above, the four colors processed may be represented by $C_2M_2Y_2V_2$.

$$[CMYK]_{Gra} \xrightleftharpoons[F.P.M._2]{I.P.M._2} [C_2, M_2, Y_2, V_2] \quad (2)$$

However, the $C_2M_2Y_2$ colorants of Equation 2 may not be raw printer colors. They are to be interpreted as virtual (e.g. GraCol) colors, which may be replaced using a 4-color substitution using the first 4-color solution. The inverse of the first printer model may be used to map virtual $C_2M_2Y_2$ to the 4-color printer CMYO using Equation 3.

$$[C_2M_2Y_2]_{Gra} \xrightarrow{I.P.M._1} [C_1, M_1, Y_1, O_1] \quad (3)$$

In Equation 3, $C_2M_2Y_2$ are 3 virtual source colors used to represent the original source color and an encoding of all 4 previously processed printer colors. Therefore, Equation 3 may be inserted into Equation 2 and combined to produce Equation 4. When the $C_2M_2Y_2V_2$ patches are used to characterize the printer for the second model, the virtual colors $C_2M_2Y_2$ are replaced with genuine $C_1M_1Y_1O_1$ printer colors, to produce 5-color $C_1M_1Y_1O_1V_2$ overlays suggested by Equation 4.

$$[CMYK]_{Gra} \xrightleftharpoons[F.P.M._2]{I.P.M._2} [C_2, M_2, Y_2, V_2] = [C_1, M_1, Y_1, O_1, V_2] \quad (4)$$

Figure 3:
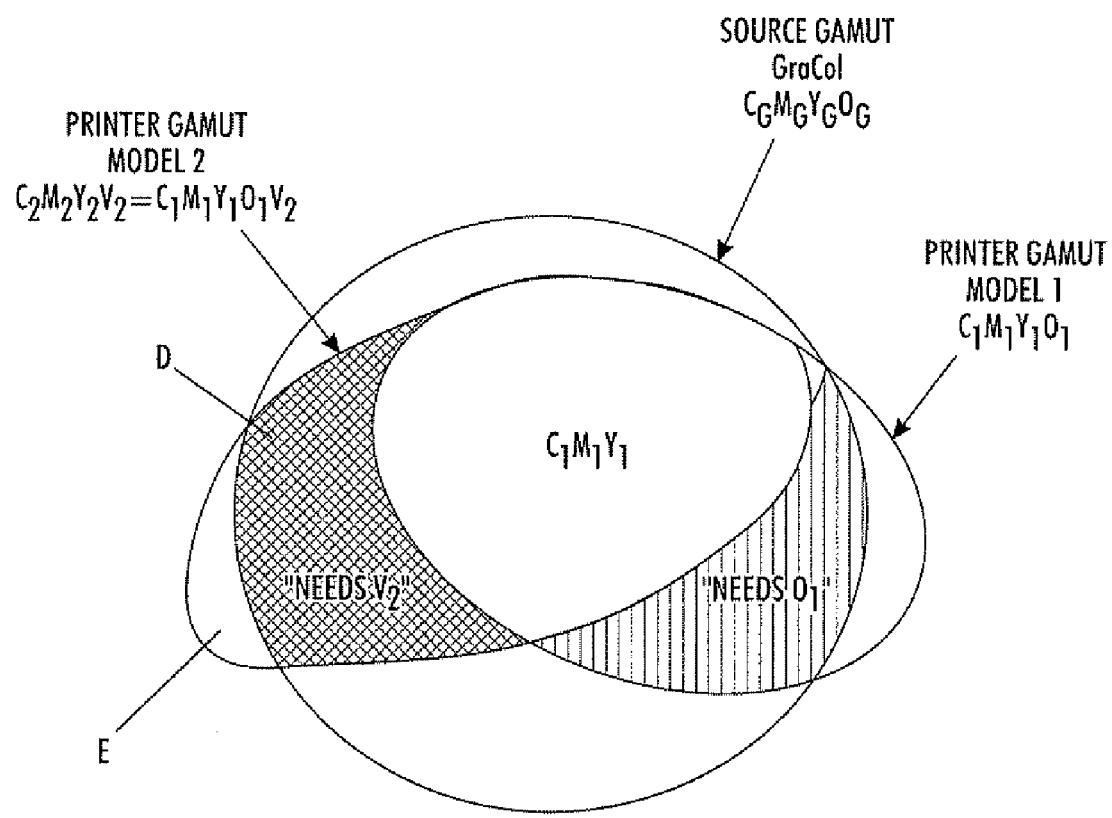
FIG. 3 shows mapping of a processed printer $C_1M_1Y_1O_1V_2$ gamut.

The 4-color tools are being deceived into acting as if they were operating on 4 printer colorants $C_2M_2Y_2V_2$. However, the virtual colors $C_2M_2Y_2$ are essentially an encoding for the first 4-color model $C_1M_1Y_1O_1$ solution, thus a 5-color solution is produced as output from the second 4-color printer model. Every point within the printer $C_1M_1Y_1O_1V_2$ gamut may be realized as shown in FIG. 3, which shows the added gamut associated with the addition of the violet color V. Those skilled in the art would appreciate that the areas supported by the printer CMYO may remain the same, or make added use of the new colorant violet, and in addition the added gamut may contain region D of the GraCol CMYK source color, which may only be achieved using the violet colorant. Region E, which lies beyond GraCol CMYK, may not be utilized.

The above-discussed 4-color virtual printer (4CVP) methodology may be extended further. A third 4-color processing stage is started, as described by Equation 5. To process the third 4-color solution, another 4-color problem may be solved using conventional 4-color tools once again. In Equation 5, $C_3M_3Y_3K_3$ may appear to be printer cyan, magenta, yellow and black colors.

$$[CMYK]_{Gra} \xrightleftharpoons[F.P.M._3]{I.P.M._3} [C_3, M_3, Y_3, K_3] \quad (5)$$

However, the $C_3M_3Y_3$ colorants of Equation 5 are virtual colors, which may be replaced using a 5-color substitution based on the previously determined color models. That is, the previous color models may be used to map virtual printer $C_3M_3Y_3$ colors to five printer colorants, and combine with black to produce the printer colors $C_1M_1Y_1O_1V_2K_3$ (i.e., CMYKOV), as suggested by Equation 6.

$$[C_3, M_3, Y_3,] \xrightarrow{F.P.M._1} [CMYK]_{Gra} \xrightarrow{I.P.M._2} [C_1, M_1, Y_1, O_1 V_2] \quad (6)$$

Therefore Equation 6 may be inserted back into Equation 5 and combined to produce Equation 7. When the CMYK patches are used to characterize the printer for the third 4-color model, the virtual $C_3M_3Y_3K_3$ printer colors may be replaced with genuine CMYOVK colors, to produce 6-color overlays, as described by Equation 7.

$$[CMYK]_{Gra} \xrightleftharpoons[F.P.M._3]{I.P.M._3} [C_3, M_3, Y_3, K_3] = [C_1, M_1, Y_1, O_1, V_2, K_3] \quad (7)$$

Figure 4:
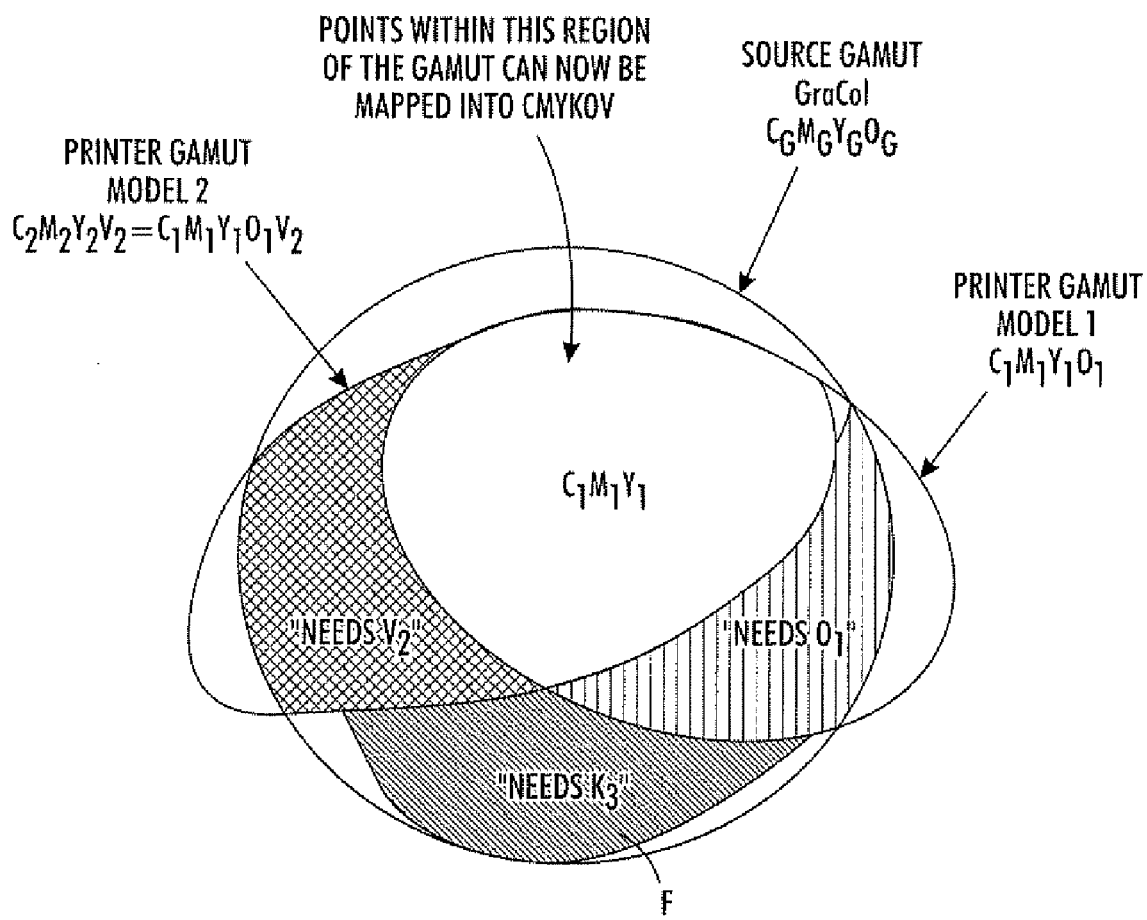
FIG. 4 shows mapping of a processed printer $C_1M_1Y_1O_1V_2K_3$ gamut.

At the conclusion of the third 4-color model processing step, the black color may have been given consideration, and every point within the printer $C_1M_1Y_1O_1V_2K_3$ gamut may be realized. This printer gamut is illustrated in FIG. 4, which shows the added gamut associated with the addition of black. Those skilled in the art would appreciate that the added gamut region F of the GraCol CMYK source color that may only be achieved using printer black. Other regions of the gamut could stay the same but are likely to use some black colorant to allow for a smooth transition from regions that may use black into regions that must use black. Also, those skilled in the art would appreciate that this cascaded model that exploits the virtual color methodology may be used to reassign each printer assignment throughout the printer gamut into a 6-color $C_1M_1Y_1O_1V_2K_3$ assignment.

The embodiment discussed thus far may be the most complex case, wherein the source color space (e.g. Gracol CMYK) has a larger gamut than the 4+ color printer in some areas, but the 4+ color printer gamut extends beyond the source space in other areas (e.g. as represented by region A in FIG. 2b). In a more typical embodiment, the entire 4+ color printer gamut is exploited. To achieve this, an embellished virtual source color space may be employed. In this embodiment, an original source space (e.g. Gracol CMYK) is inflated by scaling the source gamut. As hue angle is held constant, the saturation and lightness is scaled as necessary to encompass the entire 4+ color printer gamut. Starting off with a virtual source color space as described will guarantee that all of the 4+ color printer capability may be completely utilized.

With this example, existing 4-color tools may be leveraged to construct a color solution to an N-color system, where N>4. This may be accomplished by executing a succession of steps that are each made to appear as conventional 4-color tasks. The first task may be a 4-color problem. Subsequent tasks may assume that printer colors are virtual, to produce solutions to system colors with more than 4 colorants. Each 4-color solution step brings one additional color separation into the model.

Those having ordinary skill in the art will appreciate that variations of this technique may include changing the order of the colors to be added to each 4-color model. For instance, violet V may be processed first instead of orange O. In addition, this technique may be used to solve a system color for a machine with more (or less) than 6 colors using the above exemplary methodology. Furthermore, every part of the realizable printer gamut may use each color as that color is brought into the model. For example, the region of the printer gamut that could be achieved by using only printer CMY could choose to make use of orange based on the first stage of the model (which only supports $C_1M_1Y_1O_1$). This same region may use some printer violet colorant after the second stage of the model is complete (which only supports $C_1M_1Y_1O_1V_2$). Lastly, as black is brought into the model in the third stage, this same portion of the gamut (which could have been realized with printer CMY only) could make use of all 6 printer colorants ($C_1M_1Y_1O_1V_2K_3$). In this way, smoothly changing color usage may be in effect for each printer colorant throughout the entire printer gamut. Therefore, points previously found to be completely within the $C_1M_1Y_1$ gamut may be reassigned 6-color models that have been generated throughout the N-color design procedure. The above embodiment is described for GraCol CMYK, but any sufficiently large source color space may similarly benefit by using this technology. Furthermore, at the end of each color-processing step, smoothing may be performed to smooth the processed color. Such smoothening may be performed by using a relaxation technique, where each sample point of the gamut is adjusted based on context using a weighted sampling of neighboring points. This is performed iteratively until the solution converges to a smooth stationary result, or any known smoothing method.

Figure 5:
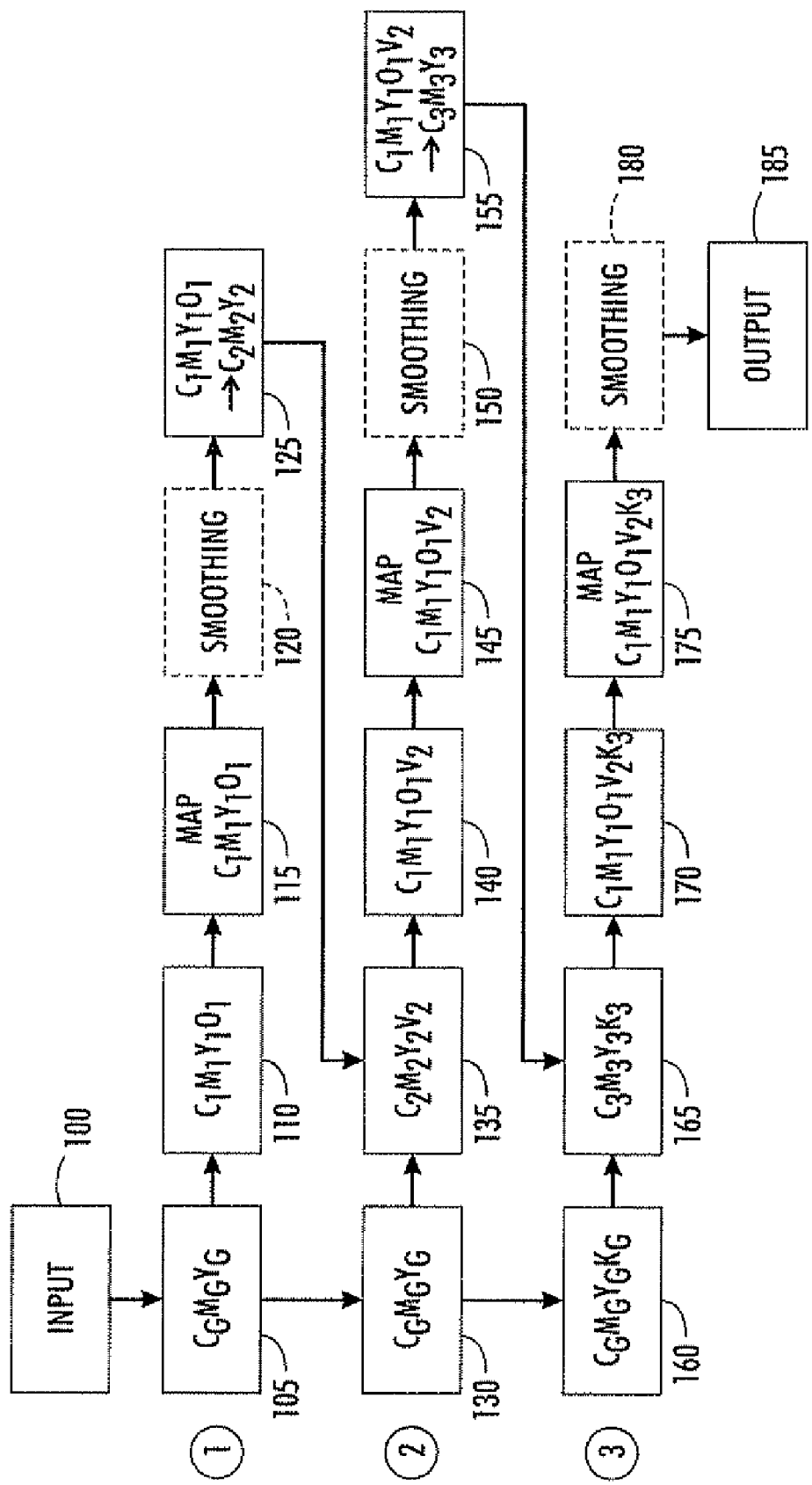
FIG. 5 is a flowchart showing processes of 4+ color management.

Next, an exemplary flow of the above-discussed color processing will be discussed using the flow chart shown in FIG. 5. In this exemplary flow, it is assumed that the device supports six colors, CMYKOV, and that the colors are processed in the same order as the above example.

The process starts at S100 and continues to step S105. At step S105, to start the first 4-color solution model, GraCol CMY is taken from the color information of input image data. The GraCol CMY may then be processed with a colorant other than traditional 4-color colorants (CMYK). In this example, orange O is processed at step S110 to generate printer color $C_1M_1Y_1O_1$. At step S115, a collection of printer CMYO patches may be mapped, and the L*a*b* values for the patches may be measured ([CMYO]$_{printer}$→L*a*b*); where ([CMYO]$_{printer}$ represents the CMYO color information based on the colors supported by the 4+ color printing system). Based on the L*a*b* values, the printer may be characterized so that for every combination of printer CMYO, the corresponding L*a*b* value may be determined.

At step S120, an optional smoothing may be performed on $C_1M_1Y_1O_1$. The smoothing may be performed to smoothen the mapping from source color to $C_1M_1Y_1O_1$ usage. Such smoothening may be performed by using a relaxation technique, where each sample point of the gamut is adjusted based on context using a weighted sampling of neighboring points. This is performed iteratively until the solution converges to a smooth stationary result, or any known smoothing method. The object for smoothing the mapping is to guarantee that small changes in input color correspond to small changes in output colorant usage. In addition, sweeps over any interval of input color may correspond to fixed or smoothly changing usage of each output colorant, with low levels of curvature.

At step S125, the processed $C_1M_1Y_1O_1$ is mapped using the forward printer model to virtual colors $C_2M_2Y_2$, which may be similar to GraCol CMY.

At step S130, to start the second 4-color solution model, a 4-color virtual printer (4CVP) deception may begin by substituting patches of printer CMY with GraCol CMY, which is then replaced with printer CMYO using the first inverse printer model. Here, $C_GM_GY_G$ may be equivalent to $C_2M_2Y_2$ processed at step S125. At Step S135, the violet V may be added to be processed with the virtual colors $C_2M_2Y_2$. $C_2M_2Y_2$ may be interpreted as virtual GraCol colors, which may be replaced using a 4-color substitution using the first 4-color solution. $C_2M_2Y_2$ are generated from the first processed 4-color solution. Therefore, when $C_2M_2Y_2V_2$ patches are used to characterize the printer for the second model, the virtual $C_2M_2Y_2$ printer colors may be replaced with genuine $C_1M_1Y_1O_1$ colors as generated at step S125, to assess the printer response to 5-color printer CMYOV overlays. Therefore, at step S140, $C_1M_1Y_1O_1V_2$ may be generated by replacing $C_2M_2Y_2$ with $C_1M_1Y_1O_1$ as generated at step S125.

At step S145, the printer $C_1M_1Y_1O_1V_2$ gamut may be mapped. Every point within the printer $C_1M_1Y_1O_1V_2$ gamut may be realized as shown in FIG. 3, which shows the added gamut associated with the addition of the violet V. Those skilled in the art would appreciate that the added gamut of region D as shown in FIG. 3, may be achieved by using the violet colorant, and the gamut region supported by CMYO may remain the same, but it is also permitted to exploit some violet colorant to allow for a smooth transition of colorant usage throughout the gamut.

Then, similar to step S120, the optional smoothing on the $C_1M_1Y_1O_1V_2$ may be performed at step S150, and at step S155, the processed $C_1M_1Y_1O_1V_2$ is mapped back to virtual colors $C_3M_3Y_3$ using the second forward printer model.

The third 4-color solution model starts at step S160. At step S160, a second 4-color virtual printer (4CVP) deception may begin by again taking the GraCol CMY as the colors used in the virtual printer. Here, $C_GM_GY_G$ may be equivalent to $C_3M_3Y_3$ processed at the second solution. At Step S165, the black color K is added to be processed with the $C_3M_3Y_3$. $C_3M_3Y_3$ colorants are virtual colorants that may be interpreted as GraColCMY, which may be replaced using the results from the prior 4-color models. $C_3M_3Y_3$ may be generated from the previously processed 4-color solutions. At step S170, when $C_3M_3Y_3K_3$ patches are used to characterize the printer for the third model, the virtual $C_3M_3Y_3$ printer colors may be replaced with genuine $C_1M_1Y_1O_1V_2$ colors as generated at step S155, to produce 6-color CMYOVK overlays. At step S175, the printer $C_1M_1Y_1O_1V_2K_3$ may be mapped.

Then, similar to step S120, optional smoothing on the $C_1M_1Y_1O_1V_2K_3$ may be performed at step S180, and at step S185, the processed $C_1M_1Y_1O_1V_2K_3$ may be output to a device, such as a printing engine, for rendering the processed image.

Figure 6:
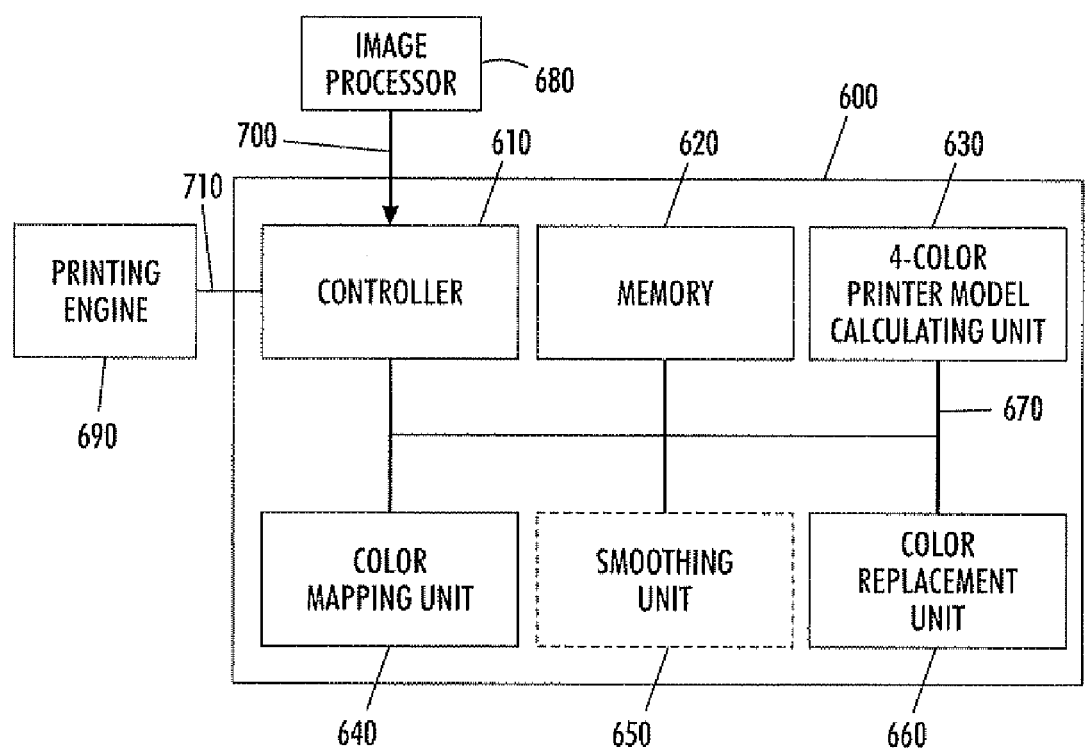
FIG. 6 is a block diagram showing a 4+ color management device.

FIG. 6 shows a block diagram of an exemplary 4+ color management device 600 according to an embodiment of the application for achieving N-color management using 4-color tools, where N>4.

The 4+ color management device 600 includes a controller 610, a memory 620, a 4-color printer model calculating unit 630, a color mapping unit 640, an optional smoothing unit 650, and a color replacing unit 660. The controller 610, the memory 620, the 4-color printer model calculating unit 630, the color mapping unit 640, the smoothing unit 650 and the color replacing unit 660 may be connected to each other by a bus 670. The 4+ color management device 600 may receive color information representing image data from an image processor 680 and transmit output information to a device, such as a printing engine 690. The image processor 680 and the printing engine 690 may be connected to the 4+ color management device 600 by communication links 700 and 710.

The controller 610 may control data flow between elements of the 4+ color management device 600. The memory 620 may serve as a buffer for information coming into or going out of the 4+ color management device 600, may store any necessary programs and/or data for implementing the functions of the 4+ color management device 600, and/or may store other types of data, such as color data at various stages of processing.

Alterable portions of the memory 620 may be, in various exemplary embodiments, implemented using static or dynamic RAM. However, the memory 620 can also be implemented using a computer executable media, such as a floppy disk and disk drive, a writable or rewritable optical disk, disk drive, such as a hard disk drive, flash memory or the like. The generally static portions of the memory 620 may, in various exemplary embodiments, be implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The 4-color printer model calculating unit 630 may receive tristimulous data produced by a scanner or spectrophotometer. This data (e.g. CIE L*a*b* or spectral reflectance functions) may be generated by measuring print samples produced by the print engine, 690. The image data may contain the color information based on the colors supported by the printing device having the printing engine 690. In the exemplary embodiment, it is assumed that the printing engine 690 supports six colors, CMYOVK. Then, the 4-color printer model calculating unit 630 may take GraCol CMY, and orange 0 from the received image data, to generate printer color $C_1M_1Y_1O_1$. However, embodiments are not limited to this.

The color mapping unit 640 may map the processed printer color $C_1M_1Y_1O_1$ patches using the L*a*b* values for the patches ($[CMYO]_{printer} \rightarrow L^*a^*b^*$); where $[CMYO]_{printer}$ represents the CMYO color information based on the colors supported by the 4+ color printing system). Based on the L*a*b* values, the printer may be characterized so that for every combination of printer CMYO, the corresponding L*a*b* value may be estimated.

In particular, the color mapping unit 640 may employ a 3-D look-up-table (LUT) to index tristimulous values (e.g. L*a*b*) to 4-D printer colorant usage (e.g. CMYO). The 3-D LUT is a sampled version of the gamut, and interpolation may be used to map every point in the gamut to the corresponding 4-color overlay required, as illustrated by the shaded areas on FIG. 2b, which may include region A that is not useful because the gamut is beyond the combination of GraCol CMYK, region B that represents the mapping of realizable destination colors for only $C_1M_1Y_1$ without the use of any orange colorant $O_1$, and region C which may only be achieved by using some of the gamut extension colorant, i.e., orange $O_1$ in FIG. 2b.

Then, the smoothing unit 650 may optionally perform smoothing on $C_1M_1Y_1O_1$. The smoothing may be performed to guarantee that any smooth sweeps in tristimulous value (e.g. L*a*b*) correspond to smoothly changing 4-color overlay composition. Such smoothening operation may be performed by using a relaxation technique, where each sample point of the gamut is adjusted based on context using a weighted sampling of neighboring points. On the gamut boundary, an encompassing context may not be available. However, a modified approach possibly using extrapolation can be used to guarantee smoothness at the boundary without gamut loss. This smoothing operation is performed iteratively until the solution converges to a smooth stationary result, or any known method.

The color replacement unit 660 may replace the processed $C_1M_1Y_1O_1$ with $C_2M_2Y_2$ using the first forward printer model for $C_1M_1Y_1O_1$. The color replacement unit 660 responds to demands for $C_2M_2Y_2$ patch requirements needed by the print engine 690 to produce input data to be transmitted to construct the second color model using the 4-color printer model calculating unit 630.

At the 4-color printer model calculating unit 630, violet V may then added to $C_2M_2Y_2$. Using the 4-color solution, $C_2M_2Y_2V_2$ may be generated. $C_2M_2Y_2$ colorants may not be raw printer colors and may be interpreted as virtual GraCol colors, which may be replaced using a 4-color substitution using the first 4-color solution. $C_2M_2Y_2$ may generated from the previously processed 4-color solution. Therefore, when $C_2M_2Y_2V_2$ patches are used to characterize the printer for the second model, the virtual $C_2M_2Y_2$ printer colors are replaced with genuine $C_1M_1Y_1O_1$ colors by the color replacement unit 660, to produce 5-color CMYOV overlays. Therefore, the 4-color model calculating unit 630 can use $C_1M_1Y_1O_1V_2$ patches by replacing $C_2M_2Y_2$ with $C_1M_1Y_1O_1$.

The color mapping unit 640 may then realize every point within the printer $C_1M_1Y_1O_1V_2$ gamut as shown in FIG. 3 using interpolation. The points used to perform this interpolation may have been adjusted by smoothing unit 650. Areas supported by the printer CMYO may remain the same, but the added gamut may contain region D of the GraCol CMYK source color, which may only be achieved using the violet colorant. The color mapping unit 640 may provide region E shown in FIG. 3, which may lie beyond GraCol CMYK and may not be utilized.

The color replacement unit 660 then replaces the processed $C_1M_1Y_1O_1V_2$ with $C_3M_3Y_3$ using the forward printer model.

In the second 4-color virtual printer (4CVP) deception, the 4-color printer model calculating unit 630 may use overlay patches of $C_3M_3Y_3K_3$ that are mapped to $C_1M_fY_1O_1V_2K_3$ by the color replacement unit 660. The tristimulous values corresponding to these patches are transmitted to the 4-color model calculating unit 630 to produce the final color model. $C_3M_3Y_3$ may be generated from the previously processed 4-color solution. Therefore, when $C_3M_3Y_3K_3$ patches are used to characterize the printer for the second model, the 4-color printer model calculating unit 630 may replace the $C_3M_3Y_3$ printer colors with genuine $C_1M_1Y_1O_1V_2$ colors to produce 6-color CMYOVK overlays.

The color mapping unit 640 may then realize every point within the printer $C_1M_1Y_1O_1V_2K_3$ gamut as shown in FIG. 4. Then, the smoothing unit 650 may smooth the relationship between sweeps of input color and the corresponding overlay sweeps in printer colorants $C_1M_1Y_1O_1V_2K_3$.

The image processor 680 may be any known or later-developed device that is capable of collecting and transmitting image information to the 4+ color management device 600, such as an image scanner or spectrophotometer. The printing engine 690 may be any known or later-developed device that marks the processed image data, such as a laser printer, an inkjet printer, and a xerographic machine.

The bus 670 may be any known or later-developed device or system for connecting the controller 610, the memory 620, the 4-color printer model calculating unit 630, the color mapping unit 640, the smoothing unit 650, and the color replacing unit 660. In addition, the communication links 700 and 710 may be any known or later-developed devices or systems for connecting the image processor 680 and the printing engine 690, respectively, to the 4+ color management device 600.

These communication links 700 and 710 may be a direct cable or bus connection, a connection over a wide area network or local area network, a connection over an intranet, a connection over the Internet, or a connection over any other distributed processing network. Further, it should be appreciated that the communication links 700 and 710 can be wireless connections over a network. The network can be a local area network, a wide area network, an intranet, the Internet, or any other known or later-developed other distributed processing and storage network.

In the various exemplary embodiments outlined above, the 4+ color management device 600 can be implemented using a programmed general-purpose computer. However, the 4+ color management device 600 can also be implemented using a special purpose computer, a programmed microprocessor or microcontroller and peripheral integrated circuit elements, and ASIC or other integrated circuit, a digital signal processor, a hardware electronic or logic circuit, such as a discrete element circuit, a programmable logic device, such as PLD, PLA, FPGA or PAL, or the like. In general, any device, capable of implementing a finite state machine that is in turn capable of implementing the flowcharts shown in FIG. 5 can be used to implement the 4+ color management device 600.

Each of the units and elements of the various exemplary embodiments of the 4+ color management device 600 outlined above can be implemented as portions of a suitable programmed general purpose computer. Alternatively, each of the units and elements of the various exemplary embodiments of the 4+ color management device 600 outlined above can be implemented as physically distinct hardware circuits within an ASIC, or using FPGA, a PDL, a PLA or a PAL, or using discrete logic elements or discrete circuit elements. The particular form each of the circuits and elements of the various exemplary embodiments of the 4+ color management device 600 outlined above will take is a design choice and will be obvious and predictable to those skilled in the art.

Moreover, the various exemplary embodiments of the 4+ color management device 600 outlined above and/or various units of the various units and elements discussed above can be implemented as software routines, managers or objects executing on a programmed general purpose computer, a special purpose computer, a microprocessor or the like. In this case, the various exemplary embodiments of the 4+ color management device 600 and/or each or the various units and elements discussed above can each be implemented as one or more routines embedded in the communication network, as a resource residing on a server, or the like. The various exemplary embodiments of the 4+ color management device 600 and the various units and elements discussed above can also be implemented by physically incorporating the 4+ color management device 600 into software run by a processor and/or a hardware system, such as the hardware and software system of a web server or a client device.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An N-color color management method, where N>4, comprising:
   receiving image data information of at least five colors;
   processing four colors of the at least five colors with a 4-color management tool to form a first 4-color model;
   mapping the processed four colors into three virtual colors using the first printer model;
   processing the mapped virtual three colors and one additional unprocessed color of the at least five colors with the 4-color management tool to form a second 4-color model;
   cascading the first and second 4-color models to form a color model of at least five output colors; and
   generating print samples with the processed at least five colors.

2. The color management method according to claim 1, further comprising:
   smoothing at least one of the processed colors.

3. The color management method according to claim 1, further comprising:
   mapping the processed four colors into three virtual colors and processing these colors with another one of unprocessed colors of the at least five colors.

4. The color management method according to claim 1) wherein the at least five colors comprise a model containing at least cyan, magenta, yellow, and black.

5. The color management method according to claim 1, wherein the three colors include GraCol CMY.

6. The color management method according to claim 1, wherein the four colors include at least a virtual CMY that captures an entire 4-color printer gamut.

7. An N-color color management apparatus, where N>4, comprising:
   an input for receiving image color information;
   a controller;
   a 4-color printer model calculating unit that obtains and processes color information of at least five colors using multiple stages of 4 color processing;
   a color replacement unit that maps four color information into three virtual color information; and
   an output that outputs 5 color processed color information;
   wherein the 4-color printer model calculating unit initially in a first stage processes four of the at least five colors to form a first 4-color model;
   the color replacement unit maps three virtual colors into four printer colors;
   the 4-color printer model calculating unit processes the mapped three virtual colors and one unprocessed color of the at least five colors in a subsequent stage to form a second 4-color model, and
   generating a color model of at least 5 colors from the first stage and second stage color models.

8. The color management apparatus according to claim 7, further comprising:

a smoothing unit that smoothens at least one of the processed colors.

9. The color management apparatus according to claim 7, further comprising:
a color mapping unit that maps the three virtual colors and one of unprocessed colors of the at least five colors into five printer colors.

10. The color management apparatus according to claim 7, wherein the at least five colors comprise a model containing at least cyan, magenta, yellow, and black.

11. The color management apparatus according to claim 7, wherein the three colors include GraCol CMY.

12. The color management apparatus according to claim 7, wherein the four colors include at least a virtual CMY that captures an entire 4+ color printer gamut.

13. A non-transitory computer readable medium that a stores an N-color management program, the program causing a computer to perform:
receiving image data information of at least five colors;
processing four colors of the at least five colors with a 4-color management tool to form a first 4-color model;
mapping three virtual colors into 4 printer colors;
processing the mapped three virtual colors and one unprocessed color of the at least five colors with the 4-color management tool to form a second 4-color model;
cascading the first and second 4-color models to form a color model of at least five colors; and
generating print samples with the processed at least five colors.

14. The non-transitory computer readable medium according to claim 13, wherein the program causes the computer to further perform:
smoothing at least one of the processed colors.

15. The non-transitory computer readable medium according to claim 13, wherein the program causes the computer to further perform:
mapping the three virtual colors and processing these colors with another one of unprocessed colors of the at least five printer colors.

16. The non-transitory computer readable medium according to claim 13, wherein the at least five colors comprise a model out of six possible colors containing at least cyan, magenta, yellow, black.

17. The non-transitory computer readable medium according to claim 13, wherein the three colors include GraCol CMY.

18. The non-transitory computer readable medium according to claim 13, wherein the four colors include at least a virtual CMY that captures an entire 4-color printer gamut.

19. A xerographic device comprising a processor performing the method according to claim 1.

20. A xerographic device comprising the apparatus according to claim 7.

* * * * *